United States Patent
Hanson et al.

(10) Patent No.: US 8,276,012 B2
(45) Date of Patent: Sep. 25, 2012

(54) PRIORITY-BASED POWER CAPPING IN DATA PROCESSING SYSTEMS

(75) Inventors: Heather L. Hanson, Austin, TX (US);
Charles R. Lefurgy, Austin, TX (US);
Karthick Rajamani, Austin, TX (US);
Freeman L. Rawson, III, Austin, TX (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 12/495,188

(22) Filed: Jun. 30, 2009

(65) Prior Publication Data

US 2010/0332872 A1    Dec. 30, 2010

(51) Int. Cl.
*G06F 1/26* (2006.01)
(52) U.S. Cl. ........................ 713/320; 718/100
(58) Field of Classification Search .......... 713/320–340; 718/100

See application file for complete search history.

(56) References Cited

U.S. PATENT DOCUMENTS

| | | | |
|---|---|---|---|
| 6,363,515 B1 | 3/2002 | Rajgopal et al. | |
| 6,618,811 B1 | 9/2003 | Berthaud et al. | |
| 6,976,178 B1 | 12/2005 | Kissell | |
| 7,155,623 B2 | 12/2006 | Lefurgy et al. | |
| 7,272,732 B2 | 9/2007 | Farkas et al. | |
| 7,421,691 B1 * | 9/2008 | Hancock et al. | 718/100 |
| 7,444,526 B2 | 10/2008 | Felter et al. | |
| 7,496,772 B1 | 2/2009 | Nguyen | |
| 7,644,293 B2 | 1/2010 | Sistla et al. | |
| 7,669,071 B2 | 2/2010 | Cochran et al. | |
| 7,684,876 B2 | 3/2010 | Grgic | |
| 7,702,931 B2 | 4/2010 | Goodrum et al. | |
| 2008/0005591 A1 | 1/2008 | Trautman | |
| 2008/0222435 A1 | 9/2008 | Bolan et al. | |
| 2008/0263373 A1 | 10/2008 | Meier et al. | |
| 2009/0113221 A1 | 4/2009 | Holle et al. | |
| 2009/0119233 A1 | 5/2009 | Dunagan et al. | |
| 2009/0125293 A1 | 5/2009 | Lefurgy et al. | |
| 2010/0011227 A1 | 1/2010 | Govindan et al. | |
| 2010/0131957 A1 | 5/2010 | Kami | |

OTHER PUBLICATIONS

U.S. Appl. No. 12/940,273, 1 page.
Arndt, Richard L., et al., "Energy Allocation to Groups of Virtual Machines", U.S. Appl. No. 12/940,639, filed with the USPTO on Nov. 5, 2010, 38 pages.

(Continued)

*Primary Examiner* — Brian Misiura
*Assistant Examiner* — Kim Huynh
(74) *Attorney, Agent, or Firm* — Francis Lammes; Stephen J. Walder, Jr.; Libby Z. Toub

(57) ABSTRACT

A mechanism is provided for priority-based power capping. A power management controller identifies a set of priorities for a set of partitions of the data processing system. The power management controller determines whether a measured power of the data processing system exceeds a power cap for the data processing system. Responsive to the measured power exceeding the power cap, the power management controller sends a set of commands to a set of component actuators to adjust one or more of a set of operation parameters for a set of components associated with the set of partitions using the set of priorities. The set of component actuators adjust the one or more of the set of operational parameters associated with the set of component in order to reduce a power consumption of the data processing system.

8 Claims, 4 Drawing Sheets

OTHER PUBLICATIONS

Bounds, Daniel et al., "Optimizing the Data Center: New Dell Servers and the Dell Energy Smart Architecture", Dell Power Solutions, Jun. 2009, 5 pages.

Felter, Wes et al., "A Performance-Conserving Approach for Reducing Peak Power Consumption in Server Systems", ICS'05, Jun. 20-22, 2005, 10 pages.

Fischer, Tim et al., "A 90nm Variable-Frequency Clock System for a Power-Managed Itanium-Family Processor", IEEE International Solid-State Circuits Conference, 2005, 3 pages.

Poirier, Christopher et al., "Power and Temperature Control on a 90nm Itanium-Family Processor", IEEE International Solid-State Circuits Conference, 2005, 2 pages.

USPTO U.S. Appl. No. 12/172,151, 1 page.

Bialecki, Ryszard A. et al., "In-and Out-of-Core BEM Equation Solver with Parallel and Non-Linear Options", International Journal for Numerical Methods in Engineering, vol. 39, Dec. 30, 1996, pp. 4215-4242.

Stoess, Jan et al., "Energy Management for Hypervisor-Based Virtual Machines", University of Karlsruhe, Apr. 30, 2007, pp. 1-14.

* cited by examiner

PRIORITY-BASED POWER CAPPING IN DATA PROCESSING SYSTEMS

BACKGROUND

The present application relates generally to an improved data processing apparatus and method and more specifically to an apparatus and method for priority-based power capping in data processing systems.

Power capping is a technique for controlling a total amount of power being consumed in a group of computing systems, a single computing system, or a subsystem within a computing system. The value or setting for a power cap is generally defined by an external or internal management entity. Within a computing system, a power control loop measures power at the input to the computing system and adjusts the power consumption of components in the computing system to meet the identified power cap setting. These adjustments may affect the performance of the components and of the entire system. If the measured power is less than the power cap, then there is more power available for the components of the computing system. Thus, the available power may be used by increasing the performance and power consumption of the components of the computing system. If the measured power is more than the power cap, then the power must be reduced, which reduces the performance of components in the computing system.

Current solutions uniformly adjust the performance of components with only one goal: to meet the power cap setting. Known current solutions fail to address issues that some components may be running higher priority or lower priority workloads. Thus, current solutions have no way to distribute the performance change, which results from the change in power consumption or allowed power consumption, in proportion to the wishes expressed by set priority policies or priorities given to the computing system components by a user.

SUMMARY

In one illustrative embodiment, a method, in a data processing system, is provided for priority-based power capping. The illustrative embodiment identifies a set of priorities for a set of partitions of the data processing system. The illustrative embodiment determines whether a measured power of the data processing system exceeds a power cap for the data processing system. The illustrative embodiment sends a set of commands to a set of component actuators to adjust one or more of a set of operation parameters for a set of components associated with the set of partitions using the set of priorities in response to the measured power exceeding the power cap. The illustrative embodiment adjusts the one or more of the set of operational parameters associated with the set of component in order to reduce a power consumption of the data processing system.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

In order for power management techniques to be more commonly utilized in data processing systems, especially in mission critical infrastructure, a need exists to identify priorities around workloads that are running in the data processing system, and to have power capping performed in a manner that considers the priorities. High priority workloads should get more power and have less performance penalty, if any, than low priority ones.

The illustrative embodiments provide priority-based power capping mechanisms for coupling priority information about workloads with a power capping function in a data processing system. By coupling priority information about workloads with a power capping function, power capping may be carried out in a workload- and priority-aware manner. Priorities, which may be dynamically assigned and may be assigned based on a logical partition level, component level, or the like, may be predetermined power management policies for virtualized systems and/or based on a separate user specification. Thus, even when the controller must enforce a power cap, some partitions or components may be exempt and run at full performance.

Figure 1:
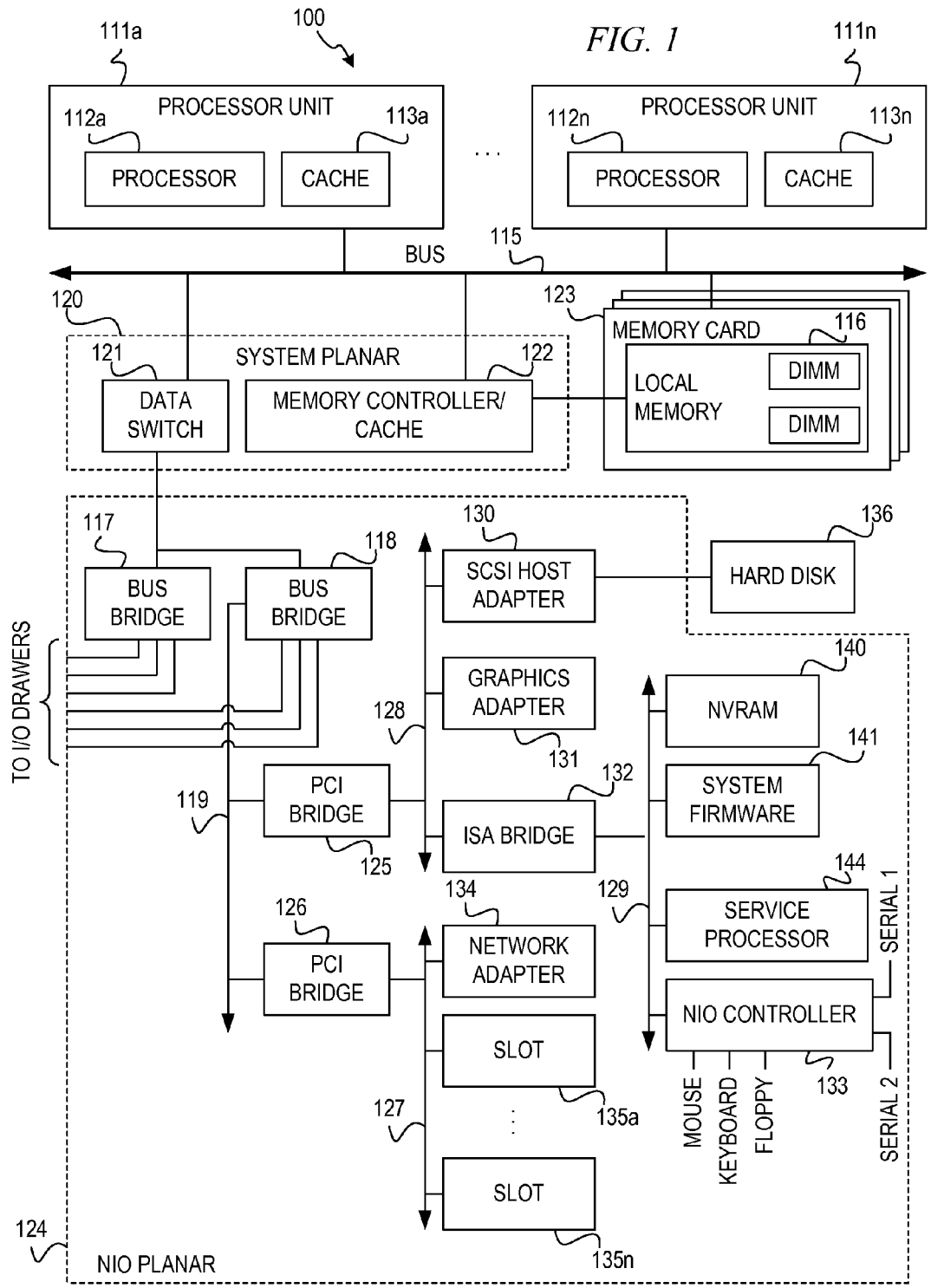
FIG. 1 depicts a block diagram of a data processing system with which aspects of the illustrative embodiments may advantageously be utilized.
Figure 2:
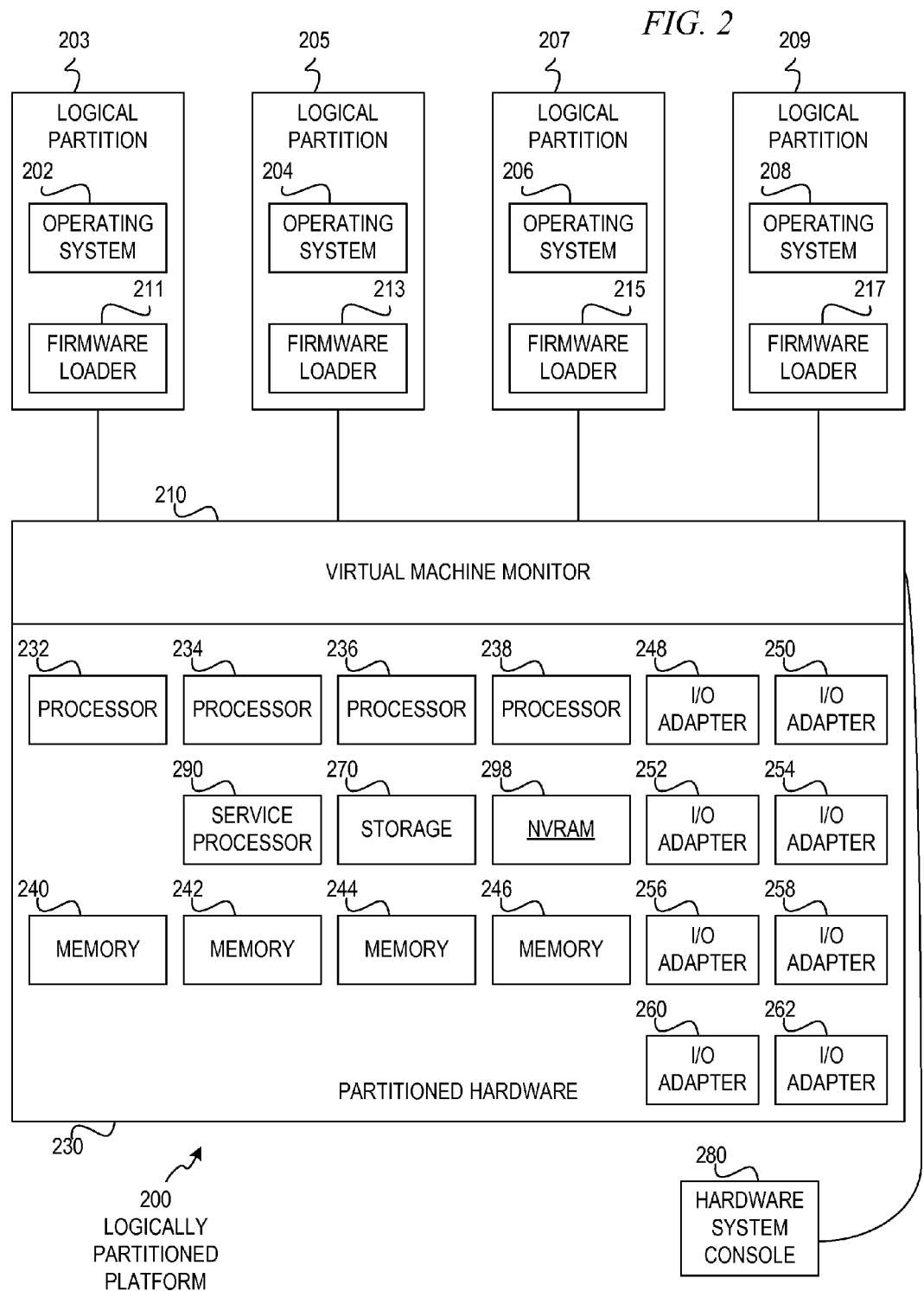
FIG. 2 depicts a block diagram of an exemplary logically partitioned platform in which the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a priority-based power capping mechanism, this is only an example and is not intended to state or imply any limitation with regard to the features of the present invention. To the contrary, the illustrative embodiments are intended to include distributed data processing environments and embodiments in which priority-based power capping may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a priority-based power capping mechanism, this is only an example and is not intended to state or imply any limitation with regard to the features of the present invention. To the contrary, the illustrative embodiments are intended to include distributed data processing environments and embodiments in which a priority-based power capping mechanism may be implemented.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

Referring now to the drawings and in particular to FIG. 1, there is depicted a block diagram of a data processing system with which aspects of the illustrative embodiments may advantageously be utilized. As shown, data processing system 100 includes processor units 111*a*-111*n*. Each of processor units 111*a*-111*n* includes a processor and a cache memory. For example, processor unit 111*a* contains processor 112*a* and cache memory 113*a*, and processor unit 111*n* contains processor 112*n* and cache memory 113*n*.

Processor units 111*a*-111*n* are connected to main bus 115. Main bus 115 supports system planar 120 that contains processor units 111*a*-111*n* and memory cards 123. System planar 120 also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. Graphics adapter 131 may be directly or indirectly connected to PCI bus 128. PCI bridge 126 provides connections for external data streams through network adapter 134 and adapter card slots 135*a*-135*n* via PCI bus 127.

Industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. System firmware 141 is also connected to ISA bus 129 for implementing the initial firmware functions. Service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, initial firmware or service processor loads a virtualization control program from either a disk, a flash memory, NVRAM 140, or the like. The virtualization control program then initializes and loads operating systems into the partitions. Typically, after each operating system is loaded into its own partition, the virtualization control program splits memory up among the partitions. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN). As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary logically partitioned platform is depicted in which the illustrative embodiments may be implemented. The hardware in logically partitioned platform 200 may be implemented, for example, using the hardware of data processing system 100 in FIG. 1.

Logically partitioned platform 200 includes partitioned hardware 230, operating systems 202, 204, 206, 208, and virtual machine monitor 210. Operating systems 202, 204, 206, and 208 may be multiple copies of a single operating system or multiple heterogeneous operating systems simultaneously run on logically partitioned platform 200. These operating systems may be implemented, for example, using AIX®, which is designed to interface with a virtualization mechanism, such as partition management firmware, e.g., a hypervisor. AIX® is used only as an example in these illustrative embodiments. Of course, other types of operating systems, such as AIX® and Linux®, may be used depending on the particular implementation. Operating systems 202, 204, 206, and 208 are located in logical partitions 203, 205, 207, and 209, respectively.

Hypervisor software is an example of software that may be used to implement platform (in this example, virtual machine monitor 210) and is available from International Business Machines Corporation. Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM).

Logical partitions 203, 205, 207, and 209 also include partition firmware loaders 211, 213, 215, and 217. Partition firmware loaders 211, 213, 215, and 217 may be implemented using IPL or initial boot strap code, IEEE-1275 Standard Open Firmware, and runtime abstraction software (RTAS), which is available from International Business Machines Corporation.

When logical partitions 203, 205, 207, and 209 are instantiated, a copy of the boot strap code is loaded into logical partitions 203, 205, 207, and 209 by virtual machine monitor 210. Thereafter, control is transferred to the boot strap code with the boot strap code then loading the open firmware and RTAS. The processors associated or assigned to logical partitions 203, 205, 207, and 209 are then dispatched to the logical partition's memory to execute the logical partition firmware. This firmware then loads the operating system for the partition and supports its execution.

Partitioned hardware 230 includes plurality of processors 232-238, plurality of system memory units 240-246, plurality of input/output (I/O) adapters 248-262, and storage unit 270. Each of the processors 232-238, memory units 240-246, NVRAM storage 298, and I/O adapters 248-262 may be assigned to one of multiple logical partitions 203, 205, 207, and 209 within logically partitioned platform 200, each of which corresponds to one of operating systems 202, 204, 206, and 208.

Virtual machine monitor 210 performs a number of functions and services for logical partitions 203, 205, 207, and 209 to generate and enforce the partitioning of logical partitioned platform 200. Virtual machine monitor 210 is a firmware implemented virtual machine approximate to the underlying hardware. Thus, virtual machine monitor 210 allows the simultaneous execution of independent OS images 202, 204, 206, and 208 by virtualizing the hardware resources of logical partitioned platform 200.

Service processor 290 may be used to provide various services, such as processing of platform errors in logical partitions 203, 205, 207, and 209. Service processor 290 may also act as a service agent to report errors back to a vendor, such as International Business Machines Corporation. Operations of the different logical partitions may be controlled through a hardware management console 280. Hardware management console 280 is a separate data processing system from which a system administrator may perform various functions including reallocation of resources to different logical partitions.

Again, the illustrative embodiments provide mechanisms for priority-based power capping in data processing systems, such as data processing system 100 in FIG. 1 implementing logically partitioned platform 200 in FIG. 2. The illustrative embodiments couple priority information about workloads with the power capping function of the data processing system. The priority-based power capping mechanisms allow power capping to be carried out in a workload- and priority-aware manner. Priorities may be assigned either dynamically assigned based on partition-level power management policies for virtualized systems or assigned based on a separate user specification.

Figure 3:
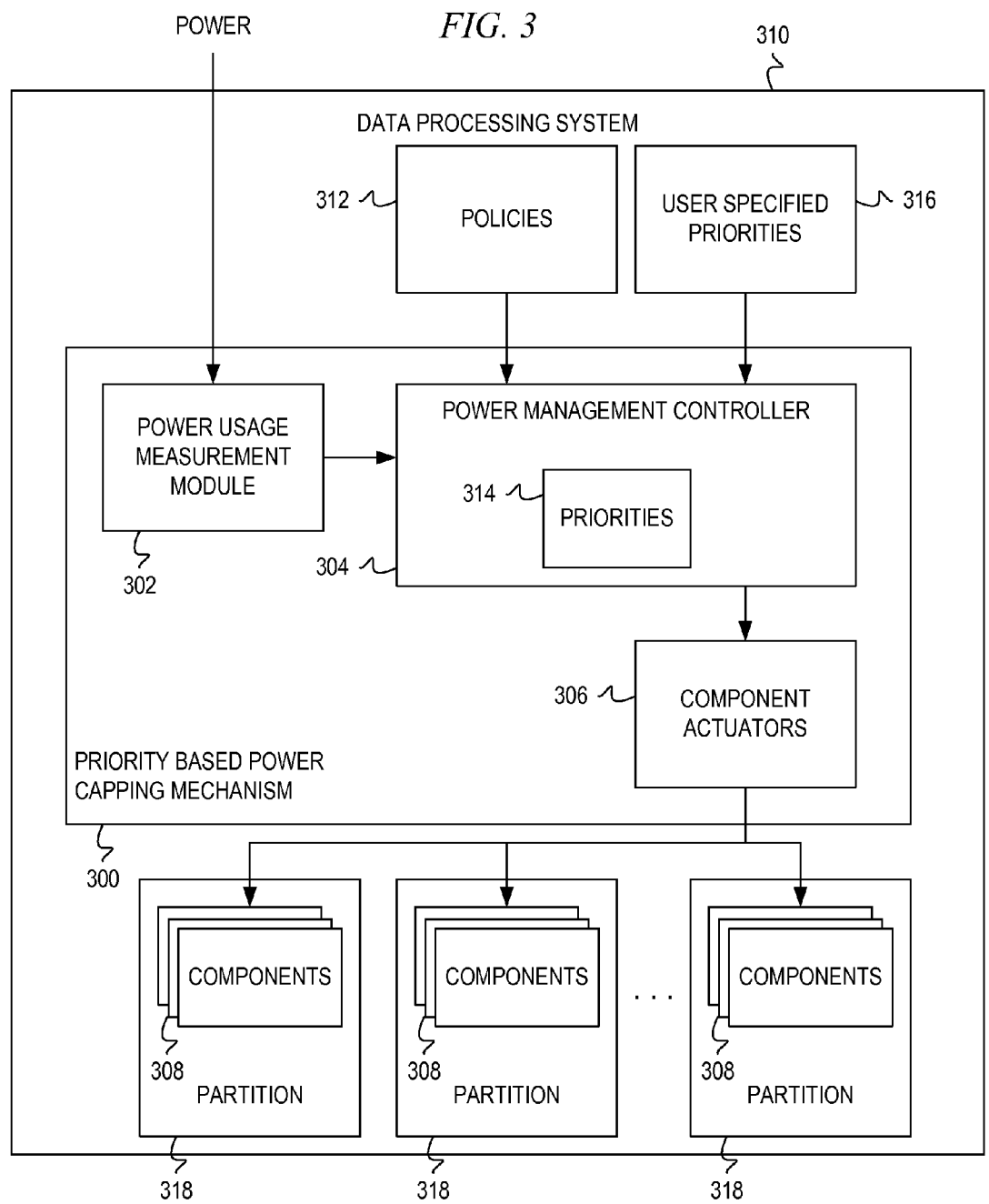
FIG. 3 depicts an exemplary block diagram of an implementation of a priority-based power capping mechanism in a data processing system in accordance with an illustrative embodiment.

FIG. 3 depicts an exemplary block diagram of an implementation of a priority-based power capping mechanism in a data processing system in accordance with an illustrative embodiment. Priority-based power capping mechanism 300 comprises power usage measurement module 302, power management controller 304, and component actuators 306, which control power to various components 308 in various ones of partitions 318. Power management controller 304 receives policies 312 that are set on a partition-by-partition basis, a component-by-component basis, or the like. Individual policies are called "modes of the power management system." Policies 312 that are on a partition by partition basis may be energy management policies assigned to each individual partition depending on the mode the partition is operating under, such as:

Nominal (NOM) mode, where power management controller 304 runs the identified partition and associated components at nominal frequency;

Static Power Save (SPS) mode, where power management controller 304 runs the identified partition and associated components at a fixed lower frequency;

Dynamic Power Save (DPS) mode, where power management controller 304 runs the identified partition and associated components at a lower frequency when "slack" is detected in cases where energy savings is higher priority than performance, but power management controller 304 system enforces a performance floor (e.g., 95% of nominal); and Dynamic Power Save-Max Performance (DPS-MP) mode, where power management controller 304 runs the identified partition and associated components as fast as possible given the power constraints on the system including above nominal by "turboing" the frequency of the identified processing units for maximum performance and thus exploits aggressive power capping and power shifting across chip- and node-level components.

These exemplary modes are provided for illustration purposes only and, thus, the illustrative embodiments are not limited in scope to just these four policies as other policies may be used without departing from the spirit and scope of the invention.

Once power management controller 304 receives policies 312, power management controller 304 transforms or maps policies 312 to the modes that partitions 318 are operating under in order to form priorities 314. For example, power management controller 304 may set a priority ($Pri_i$) for a partition that is operating in a NOM mode as a priority 1, or for a partition that is operating in a SPS mode as a priority 2, or for a partition that is operating in a DPS mode as a priority 3. Additionally, power management controller 304 may use a more complex transformation to set a priority ($Pri_i$) for a partition, such as for a partition that is operating in a DPS-MP mode. For DPS-MP mode, power management controller 304 may determine that, if the current frequency of the partition i (f_current_i) is greater than a nominal frequency (fnom) of data processing system 310, then power management controller 304 assigns the partition i a priority 2. However, if power management controller 304 determines that the current frequency of the partition i (f_current_i) is less than or equal to the nominal frequency (fnom) of data processing system 310, then power management controller 304 assigns the partition i a priority 3.

In addition to priorities 314 determined from policies 312, power management controller 304 may also receive user specified priorities 316 from a user. User specified priorities 316 may be a linear ordering of partitions based on the priority the user wants the partitions to have, such as Pri(P1)>=Pri(P2)>= . . . >=Pri(Pk). The priorities are thus in terms of the importance of not being penalized in performance when power capping must be enforced.

Once power management controller 304 transforms policies 312 to priorities 314 and identifies any user specified priorities 316, then power management controller 304 waits for power usage measurement module 302 to provide power measurement information, such as measured power, performance, frequency, or the like, at an input to data processing system 310. When power usage measurement module 302 identifies power measurement information, power usage measurement module 302 sends the power measurement information to power management controller 304. Power management controller 304 then determines where the power measurement information indicates the power of data processing system 310 is in relation to a predefined power cap. In cases where the power measurement information ($P_{measured}$) is greater than the predefined power cap ($P_{cap}$), then power management controller 304 identifies a reduction of power to the components associated with the partitions based on the priorities 314. That is, power management controller 304 may, for example, identify a reduction of power to the components associated with the partitions that have a priority of 3, then the partitions that have a priority of 2, and then partitions that have a priority of 1 until the power measurement information from power usage measurement module 302 indicates that the $P_{measured}$ is less than or equal to $P_{cap}$.

In an alternative example, in cases where the power measurement information ($P_{measured}$) is less than the predefined power cap ($P_{cap}$), then power management controller 304 may, for example, identify an increase of power to the components associated with the partitions based on the priorities 314 and user specified priorities 316. In this example, power management controller 304 may identify an increase of power to the components associated with the partitions that have a priority of 1, then the partitions that have a priority of 2, and then partitions that have a priority of 3 until the power measurement information from power usage measurement module 302 indicates that the $P_{measured}$ is greater than or equal to $P_{cap}$. The increase in power may be referred to as "boosting".

In a further example, when power management controller 304 identifies two partitions with equal priority that should reduce or increase power, then power management controller may reduce power on one of the two partitions that exhibits less performance sensitivity to frequency. In yet another example, power management controller 304 may identify a reduction or increase of power to all components associated with the partitions but reduce power for partitions that have a priority of 3 by a larger amount than the partitions that have a priority of 2 and reduce components with a priority of 1 even less than components with a priority of 2 or 3 until the power measurement information from power usage measurement module 302 indicates that the $P_{measured}$ is less than or equal to $P_{cap}$. That is, all of the components have their power increased or reduced based on a level commensurate with the priority of the partition.

The timing with which power management controller 304 identifies an increase or decrease of power to components may differ based on intervals in which power usage measurement module 302 provides the power measurement information. For example, power management controller 304 may identify a reduction of power only to components associated with a single partition that has a priority of 3 and then wait a predetermined amount of time to see if the decrease reduced $P_{measured}$ below $P_{cap}$ before identifying a reduction of power to components associated with a next single partition that has a priority of 3, 2, or 1. Alternatively, power management controller 304 identify a reduction of power only to components associated with all partitions that have a priority of 3 and then wait the predetermined amount of time to see if the decrease reduced $P_{measured}$ below $P_{cap}$ before identifying a reduction of power to components associated with partitions that have priorities of 2 or 1.

Thus, reduction or boost is dependent on whether $P_{cap}$ was exceeded or not in a last interval of the power measurement information detected by power usage measurement module 302. If $P_{measured}$ is under $P_{cap}$, then the net increase in performance for a partition is determined by its priority and the total additional power available. If $P_{measured}$ is above $P_{cap}$, then the net decrease in performance for a partition is determined by an inverse of its priority and the excess power over the cap. Performance boost or reduction is then proportional to the net power margin available or exceeded.

Once power management controller 304 identifies an increase or reduction in power for a particular set of components associated with a set of partitions, then power management controller 304 sends the associated commands to component actuators 306 which control power to components 308 associated with the identified set of partitions 318. Component actuators 306 may then adjust a frequency, a voltage, a pipeline instruction rate, or the like associated with components 308 in order to reduce the power consumed by components 308. For example, for each core j in partition i made up of core set $C_i$, component actuators 306 may decrease the frequency of core j as proportional to current frequency of core j in relation to core set $C_i$ and the net reduction in frequency for partition i.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
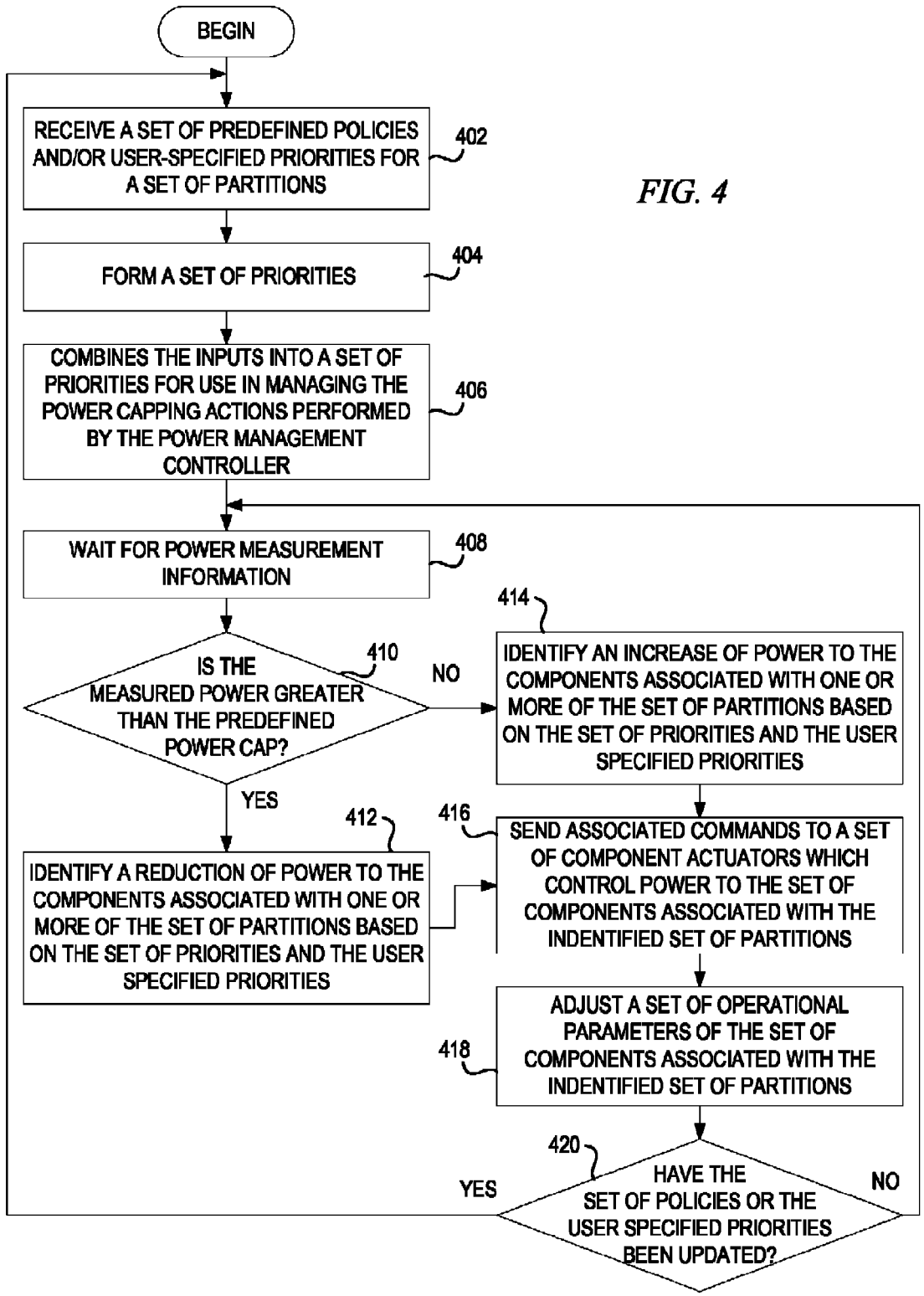
FIG. 4 depicts a flowchart outlining example operations of a priority-based power capping mechanism in accordance with an illustrative embodiment.

Referring now to FIG. 4, this figure provides a flowchart outlining example operations of a priority-based power capping mechanism in accordance with an illustrative embodiment. As the operation begins, a power management controller receives a set of predefined policies and/or user-specified priorities for a set of partitions that are defined as the partitions are generated (step 402). The user specified priorities may be a linear ordering of partitions based on the priority the user wants the partitions to have, such as $Pri(P1)>=Pri(P2)>=\ldots>=Pri(Pk)$. The set of predefined policies and/or user-specified priorities may then be used to form a set of priorities (step 404) based on a defined mapping of power management policies to priorities. The power management controller may set a priority for a partition based solely on the mode the partition is operating under or based on the mode and a current frequency of the partition in relation to a nominal frequency of the data processing system in which the partition resides.

Using the set of priorities derived from the power management policies, if any, and the set of user specified priorities, if any, the power management controller combines the inputs into a set of priorities, which the power management controller then uses to manage the power capping actions performed by the power management controller (step 406). The combination or mapping function may be any one of a number of simple schemes including having the user priorities override the ones derived from the partition policies or the schemes may optionally include a default set of priorities. At this point, the power management controller waits for a power usage measurement module to provide power measurement information, such as measured power, performance, frequency, or the like, at an input to data processing system (step 408).

When the power management controller receives power measurement information from the power usage measurement module, the power management controller determines whether the measured power ($P_{measured}$) is greater than a predefined power cap ($P_{cap}$) (step 410). If at step 410 the power management controller determines that the measured power ($P_{measured}$) is greater than a predefined power cap ($P_{cap}$), then power management controller identifies a reduction of power to the components associated with one or more of the set of partitions based on the set of priorities and the user specified priorities (step 412). That is, for instance, the power management controller identifies a reduction of power to the components associated with the partitions that have a priority of 3, then the partitions that have a priority of 2, and then partitions that have a priority of 1 until the power measurement information from the power usage measurement module indicates that the $P_{measured}$ is less than or equal to $P_{cap}$.

If at step 410 the power management controller determines that the measured power ($P_{measured}$) is less than the predefined power cap ($P_{cap}$), then the power management controller identifies an increase of power to the components associated with one or more of the set of partitions based on the set of priorities and the user specified priorities (step 414). That is, the power management controller may identify an increase of power to the components associated with the partitions that, for example, have a priority of 1, then the partitions that have a priority of 2, and then partitions that have a priority of 3 until the power measurement information from power usage measurement module indicates that the $P_{measured}$ is greater than or equal to $P_{cap}$.

From steps 412 or 414, once the power management controller identifies an increase or reduction in power for a particular set of components associated with a set of partitions, then the power management controller sends the associated commands to a set of component actuators which control power to the set of components associated with the identified set of partitions (step 416). The component actuators may then adjust a set of operational parameters, such as a frequency, a voltage, a pipeline instruction rate, or the like, of the set of components associated with the identified set of partitions in order to reduce or increase the power consumed by the set of components (step 418). Since the set of policies and the user specified priorities are dynamically defined, the power management controller determines whether the set of policies or the user specified priorities have been updated (step 420). If at step 420 the set of policies or the user specified priorities have been updated, then the operation returns to step 402. If at step 420 the set of policies or the user specified priorities are not updated, then the operation returns to step 408.

Thus, the illustrative embodiments provide mechanisms for a priority-based power capping mechanism for coupling priority information about workloads with a power capping function in a data processing system. By coupling priority information about workloads with a power capping function, power capping may be carried out in a workload- and priority-aware manner. Priorities, which may be dynamically assigned and may be assigned based on a partition-level, component level, or the like, may be predetermined power management policies for virtualized systems and/or based on a separate user specification. Thus, even when the controller must enforce a power cap, some partitions or components may be exempt and run at full performance.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for priority-based power capping, the method comprising:
   identifying, by a power management controller, a set of priorities for a set of partitions of the data processing system;
   determining, by the power management controller, whether a measured power of the data processing system exceeds a power cap for the data processing system;
   responsive to the measured power exceeding the power cap, sending, by the power management controller, a set of commands to a set of component actuators to adjust one or more of a set of operation parameters for a set of components associated with the set of partitions using the set of priorities, wherein using the set of priorities to adjust one or more of the set of operation parameters for the set of components associated with the set of partitions identifies an adjustment of power to each component in the set of components associated with the partitions based on an amount commensurate with the priority of each component; and
   adjusting, by the set of component actuators, the one or more of the set of operational parameters associated with the set of component in order to reduce a power consumption of the data processing system.

2. The method of claim 1, wherein using the set of priorities to adjust one or more of the set of operation parameters for the set of components associated with the set of partitions identifies that one or more partitions within the set of partitions that have a lower priority have their associated one of the set of operation parameters adjusted prior to other partitions within the set of partitions that have a higher priority.

3. The method of claim 1, wherein the set of priorities for the set of partitions are formed using at least one of a set of predefined policies, a set of user-specified priorities or a set of default priorities.

4. The method of claim 1, wherein the set of operational parameters is at least one of frequency, voltage, or pipeline instruction rate.

5. A computer program product comprising a computer recordable medium having a computer readable program recorded thereon, wherein the computer readable program, when executed on a computing device, causes the computing device to:
   identify a set of priorities for a set of partitions of the data processing system;
   determine whether a measured power of the data processing system exceeds a power cap for the data processing system;
   responsive to the measured power exceeding the power cap, send a set of commands to a set of component actuators to adjust one or more of a set of operation parameters for a set of components associated with the set of partitions using the set of priorities, wherein using the set of priorities to adjust one or more of the set of operation parameters for the set of components associated with the set of partitions identifies an adjustment of power to each component in the set of components associated with the partitions based on an amount commensurate with the priority of each component; and adjust the one or more of the set of operational parameters associated with the set of component in order to reduce a power consumption of the data processing system.

6. The computer program product of claim 5, wherein using the set of priorities to adjust one or more of the set of operation parameters for the set of components associated with the set of partitions identifies that one or more partitions within the set of partitions that have a lower priority have their associated one of the set of operation parameters adjusted prior to other partitions within the set of partitions that have a higher priority.

7. An apparatus, comprising:
a processor; and
a memory coupled to the processor, wherein the memory comprises instructions which, when executed by the processor, cause the processor to:
identify a set of priorities for a set of partitions of the data processing system;
determine whether a measured power of the data processing system exceeds a power cap for the data processing system;
responsive to the measured power exceeding the power cap, send a set of commands to a set of component actuators to adjust one or more of a set of operation parameters for a set of components associated with the set of partitions using the set of priorities, wherein using the set of priorities to adjust one or more of the set of operation parameters for the set of components associated with the set of partitions identifies an adjustment of power to each component in the set of components associated with the partitions based on an amount commensurate with the priority of each component; and
adjust the one or More of the set of operational parameters associated with the set of component in order to reduce a power consumption of the data processing system.

8. The apparatus of claim 7, wherein using the set of priorities to adjust one or more of the set of operation parameters for the set of components associated with the set of partitions identifies that one or more partitions within the set of partitions that have a lower priority have their associated one of the set of operation parameters adjusted prior to other partitions within the set of partitions that have a higher priority.

* * * * *